UNITED STATES PATENT OFFICE.

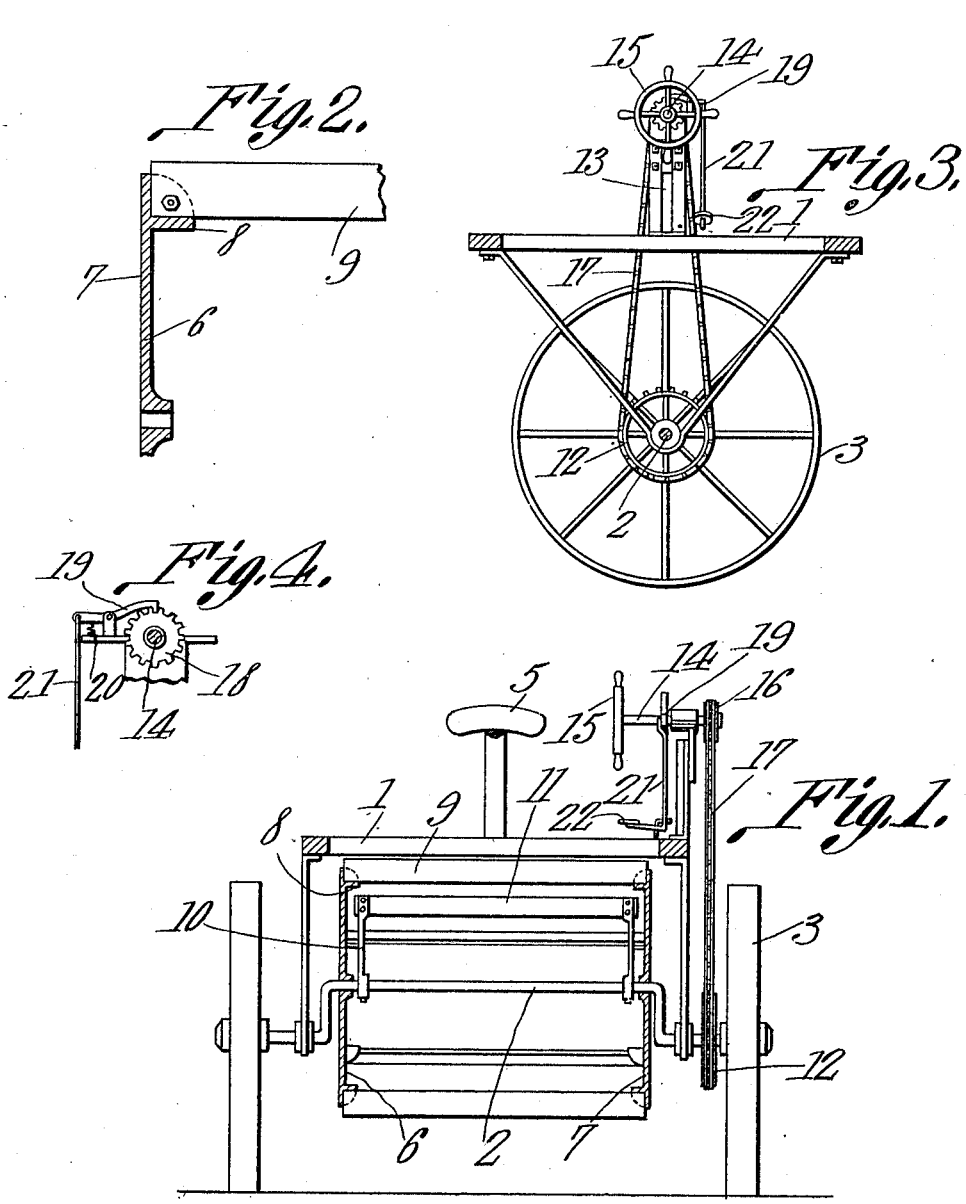

RICHARD A. MATTHEWS, OF CHESTER, SOUTH CAROLINA.

STALK-CUTTER.

992,023. Specification of Letters Patent. Patented May 9, 1911.

Application filed May 28, 1910. Serial No. 564,006.

*To all whom it may concern:*

Be it known that I, RICHARD A. MATTHEWS, a citizen of the United States, residing at Chester, in the county of Chester and State of South Carolina, have invented a new and useful Stalk-Cutter, of which the following is a specification.

This invention relates to a stalk cutter and consists in the novel construction and arrangement of its parts as hereinafter shown and described.

The object of the invention is to provide a simple and durable cutter as stated which includes a frame mounted upon a crank axle which in turn is provided with supporting wheels. A rotor is mounted upon the intermediate crank portion of the axle and a fender is also mounted upon the intermediate portion of the axle and is located within said rotor. Means is provided for turning and holding the crank axle in the frame so that the position of the rotor with relation to the surface of the ground may be adjusted.

In the accompanying drawings;—Figure 1 is a transverse sectional view of the stalk cutter. Fig. 2 is a detail sectional view of a portion of the rotor of the cutter. Fig. 3 is a detail view of a device for turning the crank axle. Fig. 4 is a detail view of a holding pawl for the axle turning device.

The stalk cutter includes a frame 1 which is mounted upon a crank axle 2. Supporting wheels 3 are journaled for rotation at the ends of the axle 2. A seat 5 is mounted upon the said frame. A rotor 6 is journaled upon the intermediate crank portion of the axle 2 and it consists of heads or end pieces 7 having upon their inner sides lugs 8. Cutting blades 9 are secured at their end portions to the lugs 8 and extend from one head 7 to the other. The cutting blades 9 are spaced from each other. Arms 10 are fixed on the intermediate crank portion of the axle 2 between the head 7 and a fender plate 11 is attached to the ends of the said arms. The plate 11 is located within the rotor 6. A sprocket wheel 12 is fixed to one end portion of the axle 2 and a standard 13 is mounted upon the frame 1. A stub shaft 14 is journaled for rotation at the upper end of the standard 3 and is provided at its inner end with a hand wheel 15. A sprocket wheel 16 is fixed to the outer end of the shaft 14 and a sprocket chain 17 passes around the sprocket wheels 12 and 16. Therefore it will be seen that by rotating the shaft 14 through the instrumentality of the hand wheel 15 that the chain 17 will be moved about the wheels 12 and 16 and the axle 2 will be turned in its bearings in the frame 1. Thus means are provided for raising and lowering the rotor. A ratchet wheel 18 is also fixed to the shaft 14 and a holding pawl 19 is pivoted upon the upper end portion of the standard 13 and at its free end is adapted to engage the teeth of the wheel 18. A spring 20 normally holds the free end of the pawl 19 in engagement with the teeth of the wheel 18 and a rod 21 is pivotally connected at its upper end with the said pawl 19. The lower end of the rod 21 is pivotally connected with a foot pedal 22 which may be depressed, thereby swinging the pawl 19 and disengaging its free end from the teeth of the wheel 18.

As the machine is drawn along a row of stalks the blades 9 carried by the rotor encounter the stalks and the said stalks are cut in sections. Should any portions of the stalks wedge or lodge between the blades 9 and be carried up as the rotor turns the said stalks will come in contact with the fender 11 and will be pushed from between the said blades 9.

Having thus described the invention what I claim as new and desire to secure by Letters Patent is:

A stalk cutter comprising a frame mounted upon a wheel-supported axle, a rotor journaled upon the axle and having spaced blades, and a fender fixed to the axle and located within the rotor and spaced from the axle.

In testimony that I claim the foregoing as my own, I have hereto affixed my signature in the presence of two witnesses.

RICHARD A. MATTHEWS.

Witnesses:
G. F. JONES,
N. E. BRADFORD.